(12) United States Patent
Surace et al.

(10) Patent No.: US 8,181,417 B2
(45) Date of Patent: *May 22, 2012

(54) ACOUSTICAL SOUND PROOFING MATERIAL AND METHODS FOR MANUFACTURING SAME

(75) Inventors: Kevin J. Surace, Sunnyvale, CA (US); Marc U. Porat, Beverly Hills, CA (US)

(73) Assignee: Serious Energy, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/607,190

(22) Filed: Nov. 30, 2006

(65) Prior Publication Data

US 2007/0094950 A1    May 3, 2007

Related U.S. Application Data

(63) Continuation of application No. 10/658,814, filed on Sep. 8, 2003, now Pat. No. 7,181,891.

(51) Int. Cl.
*E04B 1/32* (2006.01)
*E04B 7/08* (2006.01)

(52) U.S. Cl. ...... 52/642; 52/787.11; 52/309.9; 52/783.1

(58) Field of Classification Search ............... 52/642, 52/787.11, 783.1, 786.11, 796.1, 309.9, 790.1, 52/783.19; 428/471, 703; 156/307.1

See application file for complete search history.

(56) References Cited

U.S. PATENT DOCUMENTS

| | | | |
|---|---|---|---|
| 2,811,906 A | 11/1957 | Chappell | |
| 3,092,250 A | 6/1963 | Knutson et al. | |
| 3,106,503 A | 10/1963 | Randall et al. | |
| 3,160,549 A | 12/1964 | Caldwell et al. | |
| 3,424,270 A | 5/1965 | Hartman et al. | |
| 3,215,225 A | 11/1965 | Kirschner | |
| 3,336,710 A | 8/1967 | Raynes | |
| 3,399,104 A | 8/1968 | Ball, III et al. | |
| 3,462,899 A | 8/1969 | Sherman | |
| 3,468,750 A | 9/1969 | Pfeifer et al. | |
| 3,579,941 A | 5/1971 | Tibbals | |
| 3,642,511 A | 2/1972 | Cohn et al. | |

(Continued)

FOREIGN PATENT DOCUMENTS

CA    2219785    10/1996

(Continued)

OTHER PUBLICATIONS

Noise and Vibration Control Engineering: *Principles and Applications*, Edited by Leo Beranek and Instvan Ver, Chapter 11, John Wiley & Sons, Inc., 1002, (12 pages).

(Continued)

*Primary Examiner* — Eileen D Lillis
*Assistant Examiner* — Chi Nguyen
(74) *Attorney, Agent, or Firm* — Haynes and Boone, LLP (57) ABSTRACT

An improved acoustical damping wall (ceiling or floor) or door material comprises a laminar structure having as an integral part thereof one or more layers of viscoelastic material which also functions as a glue and one or more constraining layers, such as metal, cellulose, wood, or petroleum-based products such as plastic, vinyl, plastic or rubber. In one embodiment, standard wallboard, typically gypsum, comprises the external surfaces of the laminar structure; and one or more constraining layers are fabricated between the gypsum exterior. The resulting structure improves the attenuation of sound transmitted through the structure.

19 Claims, 8 Drawing Sheets

U.S. PATENT DOCUMENTS

| | | | |
|---|---|---|---|
| 3,652,360 A * | 3/1972 | Hartman et al. ......... 156/244.11 | |
| 3,728,209 A | 4/1973 | Sugaike et al. | |
| 3,828,504 A | 8/1974 | Egerborg et al. | |
| 4,003,752 A | 1/1977 | Osohata et al. | |
| 4,112,176 A | 9/1978 | Bailey | |
| 4,117,197 A | 9/1978 | Krejci et al. | |
| 4,156,615 A | 5/1979 | Cukier et al. | |
| 4,259,220 A * | 3/1981 | Bunnelle et al. ............... 525/98 | |
| 4,347,912 A | 9/1982 | Flocke et al. | |
| 4,364,017 A | 12/1982 | Tokunaga et al. | |
| 4,375,516 A | 3/1983 | Barrall | |
| 4,487,793 A | 12/1984 | Haines et al. | |
| 4,488,619 A | 12/1984 | O'Neill | |
| 4,618,370 A | 10/1986 | Green et al. | |
| 4,642,951 A | 2/1987 | Mortimer | |
| 4,663,224 A * | 5/1987 | Tabata et al. ................. 442/181 | |
| 4,678,515 A | 7/1987 | Green et al. | |
| 4,685,259 A | 8/1987 | Eberhart et al. | |
| 4,719,261 A * | 1/1988 | Bunnelle et al. ............... 525/97 | |
| 4,759,164 A | 7/1988 | Abendroth et al. | |
| 4,778,028 A | 10/1988 | Staley | |
| 4,786,543 A | 11/1988 | Ferm | |
| 4,791,044 A * | 12/1988 | Yoshino ................. 430/270.21 | |
| 4,924,969 A * | 5/1990 | L'Heureux ................... 181/290 | |
| 4,956,321 A | 9/1990 | Barrall | |
| 4,967,530 A | 11/1990 | Clunn | |
| 5,016,413 A | 5/1991 | Counihan | |
| 5,026,593 A | 6/1991 | O'Brien | |
| 5,033,247 A | 7/1991 | Clunn | |
| 5,063,098 A | 11/1991 | Niwa et al. | |
| 5,110,660 A | 5/1992 | Wolf et al. | |
| 5,125,475 A | 6/1992 | Ducharme et al. | |
| 5,143,790 A | 9/1992 | Sattinger | |
| 5,158,612 A | 10/1992 | Savoly et al. | |
| 5,240,639 A | 8/1993 | Diez et al. | |
| 5,256,223 A | 10/1993 | Alberts et al. | |
| 5,258,585 A | 11/1993 | Juriga | |
| 5,304,415 A | 4/1994 | Kurihara et al. | |
| 5,334,806 A | 8/1994 | Avery | |
| 5,342,465 A | 8/1994 | Bronowicki et al. | |
| 5,368,914 A | 11/1994 | Barrett | |
| 5,439,735 A | 8/1995 | Jamison | |
| 5,473,122 A | 12/1995 | Kodiyalam et al. | |
| 5,474,840 A | 12/1995 | Landin | |
| 5,502,931 A | 4/1996 | Munir | |
| 5,585,178 A | 12/1996 | Calhoun et al. | |
| 5,603,192 A | 2/1997 | Dickson | |
| 5,629,503 A * | 5/1997 | Thomasen ................... 181/199 | |
| 5,643,666 A | 7/1997 | Eckart et al. | |
| 5,664,397 A | 9/1997 | Holz | |
| 5,691,037 A | 11/1997 | McCutcheon et al. | |
| 5,695,867 A | 12/1997 | Saitoh et al. | |
| 5,768,841 A | 6/1998 | Swartz et al. | |
| 5,824,973 A | 10/1998 | Haines et al. | |
| 5,827,609 A * | 10/1998 | Ercillo et al. ................. 428/354 | |
| 5,867,957 A | 2/1999 | Holtrop | |
| 5,907,932 A | 6/1999 | LeConte et al. | |
| 5,910,082 A | 6/1999 | Bender et al. | |
| 5,918,437 A | 7/1999 | Dobija | |
| 5,945,208 A | 8/1999 | Richards et al. | |
| 5,945,643 A | 8/1999 | Casser | |
| 5,954,497 A | 9/1999 | Cloud et al. | |
| 6,077,613 A | 6/2000 | Gaffigan | |
| 6,123,171 A | 9/2000 | McNett et al. | |
| 6,213,252 B1 | 4/2001 | Ducharme | |
| 6,238,594 B1 | 5/2001 | Turpin et al. | |
| 6,240,704 B1 | 6/2001 | Porter | |
| 6,266,427 B1 | 7/2001 | Mathur | |
| 6,286,280 B1 | 9/2001 | Fahmy et al. | |
| 6,290,021 B1 | 9/2001 | Strandgaard | |
| 6,309,985 B1 | 10/2001 | Virnelson et al. | |
| 6,342,284 B1 | 1/2002 | Yu et al. | |
| 6,381,196 B1 | 4/2002 | Hein et al. | |
| 6,389,771 B1 | 5/2002 | Moller | |
| 6,443,256 B1 | 9/2002 | Baig | |
| 6,443,257 B1 | 9/2002 | Wiker et al. | |
| 6,536,555 B1 | 3/2003 | Kelsic et al. | |
| 6,632,550 B1 | 10/2003 | Yu | |
| 6,676,744 B2 | 1/2004 | Merkley et al. | |
| 6,699,426 B1 | 3/2004 | Burke | |
| 6,715,241 B2 | 4/2004 | Gelin et al. | |
| 6,758,305 B2 | 7/2004 | Gelin et al. | |
| 6,790,520 B1 | 9/2004 | Todd et al. | |
| 6,790,525 B2 * | 9/2004 | Takeuchi et al. .............. 428/339 | |
| 6,800,161 B2 | 10/2004 | Takigawa et al. | |
| 6,803,110 B2 | 10/2004 | Drees et al. | |
| 6,815,049 B2 | 11/2004 | Veeramasuneni et al. | |
| 6,822,033 B2 | 11/2004 | Yu et al. | |
| 6,825,137 B2 | 11/2004 | Fu et al. | |
| 6,877,585 B2 | 4/2005 | Tinianov | |
| 6,913,667 B2 | 7/2005 | Nudo et al. | |
| 6,920,723 B2 | 7/2005 | Downey | |
| 6,941,720 B2 | 9/2005 | DeFord et al. | |
| 7,041,377 B2 | 5/2006 | Miura et al. | |
| 7,068,033 B2 | 6/2006 | Sellers et al. | |
| 7,160,610 B2 * | 1/2007 | Takeuchi et al. .............. 428/335 | |
| 7,181,891 B2 * | 2/2007 | Surace et al. ................... 52/642 | |
| 7,197,855 B2 | 4/2007 | Della Pepa | |
| 2002/0009622 A1 | 1/2002 | Goodson | |
| 2003/0006090 A1 | 1/2003 | Reed | |
| 2003/0102184 A1 | 6/2003 | Brisson et al. | |
| 2003/0125447 A1 | 7/2003 | Hoch et al. | |
| 2004/0016184 A1 | 1/2004 | Huebsch et al. | |
| 2004/0168853 A1 | 9/2004 | Gunasekera et al. | |
| 2004/0214008 A1 | 10/2004 | Dobrusky et al. | |
| 2005/0103568 A1 | 5/2005 | Sapoval et al. | |
| 2006/0048682 A1 | 3/2006 | Wagh et al. | |
| 2006/0057345 A1 | 3/2006 | Surace et al. | |
| 2006/0059806 A1 | 3/2006 | Gosling et al. | |
| 2006/0108175 A1 | 5/2006 | Surace et al. | |
| 2007/0107350 A1 | 5/2007 | Surace et al. | |
| 2008/0264721 A1 | 10/2008 | Tinianov et al. | |
| 2009/0000245 A1 | 1/2009 | Tinianov et al. | |
| 2009/0000866 A1 | 1/2009 | Tinianov | |
| 2009/0004448 A1 | 1/2009 | Tinianov | |

FOREIGN PATENT DOCUMENTS

| | | | |
|---|---|---|---|
| CN | 2134439 | Y | 5/1993 |
| CN | 1358684 | | 7/2002 |
| EP | 0412816 | A | 2/1991 |
| EP | 1154087 | B1 | 11/2001 |
| JP | 2-117825 | | 5/1990 |
| JP | 02-117825 | | 5/1990 |
| JP | 06-250669 | A | 9/1994 |
| JP | 07-506158 | A | 7/1995 |
| JP | 08-156173 | A | 6/1996 |
| JP | 09-203153 | | 8/1997 |
| JP | 10-054096 | A | 2/1998 |
| JP | 11-219186 | A | 8/1999 |
| JP | 2001-522751 | A | 11/2001 |
| JP | 2002-164690 | | 6/2002 |
| JP | 2002-520544 | | 7/2002 |
| JP | 2003-071834 | A | 3/2003 |
| WO | WO 96/34261 | | 10/1996 |
| WO | WO 97/19033 | | 5/1997 |
| WO | WO 99/24290 | A | 5/1999 |
| WO | WO 00/02204 | A | 1/2000 |
| WO | WO 00/24690 | | 5/2000 |

OTHER PUBLICATIONS

Handbook of *Acoustical Measurements and Noise Control*, Edited by Cyril Harris, Chapter 32; Structureborne Sound Isolation, Chapter 33; Noise Control in Buildings, McGraw-Hill, Inc., 1991, (36 pages).

ASTM International, Designation: C 1396/C 1396M-04, *Standard Specification for Gypsum Board* (7 pages).

Barbara C. Lippiatt, National Institute of Standards and Technology. Bees 3.0, "*Building for Environmental and Economic Sustainability* Technical Manual and User Guide", Oct. 2002, (198 pages).

Takada, et al., *Effect in Reducing Floor Impact Noise of Recycled Paper Damper Members*, Bulletin of Tokyo Metropolitan Industrial Technology Research Institute, No. 2 (1999) [certified English translation] (13 pages).

*Architectural Acoustics*, M. David Egan, J. Ross Publishing (Reprint 2007) p. 211; originally published McGraw-Hill, 1988 (5 pages).

Hastings, Mardi C.; Godfrey, Richard; Babcock, G. Madison, *Application of Small Panel Damping Measurements to Larger Walls*, Proc.

SPIE vol. 2720, p. 70-76, Smart Structures and Materials 1996: Passive Damping and Isolation (7 pages).
van Vuure, A.W.; Verpoest, I., Ko, F.K., *Sandwich-Fabric Panels As Spacers in a Constrained Layer Structural Damping Application*, Composites Part B 32 (2001) 11-19, Elsevier Science Ltd. (9 pages).
Noise and Vibration Control, Revised Edition, pp. 306-315, Institute of Noise Control Engineering, 1988, Beranek, Leo L. (editor) (9 pages).
Noise and Vibration Control, Chapter Fourteen, *Damping of Panels*, Ungar, Eric E., pp. 434-473, McGraw-Hill, 1971, Beranek, Leo L. (editor) (7 pages).
Noise and Vibration Control Engineering, *Principles and Application*, pp. 466-479, John Wiley & Sons, 1992, Beranek, Leo L. and Ver, Istvan L. (editors) (9 pages).
Nashif, Ahid D.; Jones, David I. G.; Henderson, John P., *Vibration Damping*, pp. 290-305, John Wiley & Sons, 1985 (18 pages).
Architectural Acoustics, Principles and Practice, John Wiley & sons, 1992, Cavanaugh, William J. and Wilkes, Joseph A. (editors) (332 pages).
FIRE Resistance Design Manual, Sound Control, Gypsum Association, GA-600-94 (14th Ed.) (107 pages).
FIRE Resistance Design Manual, Sound Control, Gypsum Association, GA-600-97 (15th Ed.) (120 pages).
FIRE Resistance Design Manual, Sound Control, Gypsum Association, GA-600-2000 (16th Ed.) (139 pages).
Noxon, Arthur M., *The Chain is As Strong As its Weakest Link*, An artical written for the first Hong Kong HiFi Show, 1993, Translated and Published in Chinese, http://www.acousticsciences.com/articles/chain.htm (7 pages).
*Quiet Lightweight Floor Systems*, Reprint from Sound and Vibration Magazine, Jul. 1992, by David A. Harris, Building & Acoustic Design Consultants (7 pages).
Joyal, Brian, *Constrained-Layer Systems Provide Weight-Efficient, High Level Damping* (4 pages).
Dynamat materials http://web.archive.org/web/20010525113753/www.admteschusa.com/Dynamat.html Jun. 12, 2007, ADM Tech—Dynamic Control (15 pages).
Noise Killer: Pro Damping Compound Materials http://www.tnt-audio.com/clinica/noise.html May 18, 2007, 1998 (3 pages).
Waybackmachine search results for Jan. 1, 1996—Jun. 12, 2007 (1 page).
Frankovich, David, *The Four-Fold Method of Noise and Vibration Control* (8 pages).
Renninger, Jennifer, *Understanding Damping Techniques for Noise and Vibration Control* (8 pages).
Unified Facilities Criteria (UFC) *Noise and Vibration Control*, UFC 3-450-01. May 15, 2000, Department of Defense (156 pages).
United States Gypsum, *Architectural and Construction Services, Design Data for Acousticians*, Feb. 1986 (4 pages).
*A Study of Techniques to Increase the Sound of Insulation of Building Elements*, Wyle Laboratories, Prepared for Dept. of Housing and Urban Development, Jun. 1973 (12 pages).
dB-Ply materials Sound Reducing Panels from Greenwood Forest Products, Inc., Apr. 24, 1997 (9 pages).
dB-Rock materials OMNI Products, Inc. (3 pages).
ASC WallDamp materials from Acoustic Sciences Corporation http://web.archive.org/web/20021013031149/www.asc-soundproof.com/index-walldamp... May 18, 2007 (21 pages).
Sounddown Viscoelastic Glue DG-A2, Soundown Corporation (2 pages).
Nordisk Akustik A/S materials, http://web.archive.org/web/200206240933724/www.nordisk-akustik.dk/html_uk/prod03.ht... Jun. 11, 2007 (4 pages).
"*Damping of plate flexural vibrations by means of viscoelastic laminae*" by D. Ross, E.E. Ungar, and E.M. Kerwin—Structural Damping, Section III, ASME, 1959, New York (41 pages).
IES 2000 (Jul. 2, 2003) Atlanta.com/product pp. 1-6.
Wayback machine, p. 1 of 1.
"Green Glue is your soundproofing solution and Noise Reduction Material", www.greengluecompany.com (2 pages).
"Acoustical: A Sound Approach to Testing", www.archest.com/pages (2 pages).

"STC—Sound Transmission Class—Discussion and Use", www.sota.ca/stc_info.htm (3 pages).
Vandersall, H. L., "*Intumescent Coating Systems, Their development and Chemistry*" J. Fire & Flammability, vol. 2 (Apr. 1971) pp. 97-140 (45 pages).
English Language Abstract, JP Patent First Publication No. 09-203153, Aug. 5, 1997, (2 pages).
*A Study of Techniques to Increase the Sound of Insulation of Building Elements*, Wyle Laboratories, Prepared for Dept. of Housing and Urban Development, Jun. 1973 (16 pages).
*Field Sound Insulation Evaluation of Load-Beating Sandwich Panels for Housing*, Final Report, Prepared by Robert E. Jones, Forest Products Laboratory, Forest Service, U.S. Department of Agriculture, Aug. 1975 (53 pages).
*Sound Studio Construction on a Budget*, F. Alton Evererst, McGraw-Hill, 1997 (7 pages).
*Wood Handbook/Wood as an Engineering Material*, United States Department of Agriculture, Forest Service, General Technical Report FPL-GTR-113, Mar. 1999 (24 pages).
*Transmission Loss of Plasterboard Walls* by T. D. Northwood, Building Research Note, Division of Building Research, National Research Counsel, Ottawa, Canada (10 pages).
*A Guide to Airborne, Impact, and Structureborne Noise Control in Multifamily Dwellings*, U. S. Department of Housing and Urban Development, Prepared for the National Bureau of Standards, Washington, D. C., Jan. 1963 (5 pages).
*Transmission Loss of Leaded Building Materials*, Paul B. Ostergaard, Richmond L. Cardinell, and Lewis S. Goodfriend, The Journal of the Acoustical Society of America, vol. 35, No. 6, Jun. 1963 (7 pages).
*Dictionary of Architecture & Construction 2200 illustrations*, Third Edition, Edited by Cyril M. Harris, Professor Emeritus of Architecture Columbia University, McGraw-Hill, 2000 (7 pages).
*Dictionary of Engineering Materials*, Harald Keller, Uwe Erb, Wiley-Interscience by John Wiley & Sons, Inc. 2004 (4 pages).
*Chamber Science and Technology Dictionary*, by Professor Peter M. B. Walker, W & R Chambers Ltd and Cambridge University Press, 1988 (3 pages).
Japanese Office Action dated May 12, 2009 for corresponding Japanese Application No. 2006-525373.
Japanese Office Action dated Dec. 22, 2009 for corresponding Japanese Application No. 2006-525373.
Chinese Office Action dated Dec. 26, 2008 for corresponding Chinese Application No. 2004800325949.
Supplementary European Search Report dated Mar. 24, 2009 for corresponding European Application No. 04782564.1.
International Search Report and Written Opinion for International Application No. PCT/US10/50272 dated Nov. 15, 2010.
Pritz. "Loss Factor Peak of Viscoelastic Materials: Magnitude to Width Relations", J. of Sound and Vibration, 246(2): 265-280, 2001.
M.N. Darrouj et al., "Optimum Design of Constrained Layer Damping Panels", Materials & Design, vol. 10, No. 4, pp. 202-208, Jul.-Aug. 1989.
D.I.G. Jones, *Handbook of Viscoelastic Vibration Damping*, John Wiley and Sons, pp. 284-297, Aug. 2001.
English Language Abstract of JP 2002-164690, Published Jun. 7, 2002, 2 pages.
English Language Abstract of CN1358684, Jul. 17, 2002, 1 page.
"Acoustical: A Sound Approach to Testing", www.archest.com/pages (2 pages), 2006.
"STC—Sound Transmission Class—Discussion and Use", www.sota.ca/stc_info.htm (3 pages), 2003.
Wayback machine, p. 1 of 1, 1996.
"Green Glue is your soundproofing solution and Noise Reduction Material", www.greengluecompany.com (2 pages), 2006.
Noise and Vibration Control Engineering: *Principles and Applications*, Edited by Leo Beranek and Instvan Ver, Chapter 11, John Wiley & Sons, Inc., 1002, (12 pages), 1992.
ASTM International, Designation: C 1396/C 1396M-04, *Standard Specification for Gypsum Board* (7 pages), 2004.
FIRE Resistance Design Manual, Sound Control, Gypsum Association, GA-600-94 (14th Ed.) (107 pages), 1994.
FIRE Resistance Design Manual, Sound Control, Gypsum Association, GA-600-97 (15th Ed.) (120 pages), 1997.

FIRE Resistance Design Manual, Sound Control, Gypsum Association, GA-600-2000 (16th Ed.) (139 pages), 2000.

Joyal, Brian, *Constrained-Layer Systems Provide Weight-Efficient, High Level Damping* (4 pages), 2001.

Frankovich, David, *The Four-Fold Method of Noise and Vibration Control* (8 pages), 2003.

Renninger, Jennifer, *Understanding Damping Techniques for Noise and Vibration Control* (8 pages), 2003.

dB-Rock materials OMNI Products, Inc. (3 pages), 2003.

Sounddown Viscoelastic Glue DG-A2, Soundown Corporation (2 pages), 2006.

*Transmission Loss of Plasterboard Walls* by T. D. Northwood, Building Research Note, Division of Building Research, National Research Counsel, Ottawa, Canada (10 pages), 1966.

* cited by examiner

------- Limiting STC Contour
——— Measured Data

QuietRock Ultra panel alone

| 1/3 OCT BND CNTR FREQ | 63 | 80 | 100 | 125 | 160 | 200 | 250 | 315 | 400 | 500 |
|---|---|---|---|---|---|---|---|---|---|---|
| TL in dB | 24 | 30 | 28 | 27 | 29 | 29 | 30 | 33 | 33 | 35 |
| 95% Confidence in dB | 1.42 | 1.92 | 2.07 | 1.47 | 0.89 | 0.76 | 0.80 | 0.52 | 0.36 | 0.38 |
| deficiencies | | | | | | | (1) | (1) | (4) | (3) |
| 1/3 OCT BND CNTR FREQ | 630 | 800 | 1000 | 1250 | 1600 | 2000 | 2500 | 3150 | 4000 | 5000 |
| TL in dB | 36 | 37 | 39 | 40 | 41 | 40 | 36 | 39 | 43 | 46 |
| 95% Confidence in dB | 0.29 | 0.44 | 0.38 | 0.39 | 0.36 | 0.56 | 0.55 | 0.31 | 0.32 | 0.50 |
| deficiencies | (3) | (3) | (2) | (2) | (1) | (2) | (6) | (3) | | |

| EWR | OITC |
|---|---|
| 40 | 34 |

Specimen Area: 16 sq. ft.
Temperature: 73 deg. F
Relative Humidity: 57%
Test Date: 05 June 2003

| STC |
|---|
| 38 |
| (31) |

------- Limiting STC Contour
——— Measured Data

Standard 2x4 construction with QuietWood Ultra on 1 side-no insulation

| 1/3 OCT BND CNTR FREQ | 63 | 80 | 100 | 125 | 160 | 200 | 250 | 315 | 400 | 500 |
|---|---|---|---|---|---|---|---|---|---|---|
| TL in dB | 24 | 30 | 23 | 24 | 27 | 26 | 29 | 36 | 39 | 42 |
| 95% Confidence in dB | 1.42 | 1.92 | 2.07 | 1.47 | 0.89 | 0.76 | 0.80 | 0.52 | 0.36 | 0.38 |
| deficiencies | | | | (3) | (3) | (7) | (7) | (3) | (3) | (1) |
| 1/3 OCT BND CNTR FREQ | 630 | 800 | 1000 | 1250 | 1600 | 2000 | 2500 | 3150 | 4000 | 5000 |
| TL in dB | 43 | 47 | 48 | 50 | 52 | 53 | 53 | 54 | 53 | 54 |
| 95% Confidence in dB | 0.29 | 0.44 | 0.38 | 0.39 | 0.36 | 0.56 | 0.55 | 0.31 | 0.32 | 0.50 |
| deficiencies | (1) | | | | | | | | | |

| EWR | OITC | Specimen Area: 16 sq. ft. | STC |
|---|---|---|---|
| 42 | 33 | Temperature: 73 deg. F | 43 |
| | | Relative Humidity: 57% | (28) |
| | | Test Date: 05 June 2003 | |

ACOUSTICAL SOUND PROOFING MATERIAL AND METHODS FOR MANUFACTURING SAME

CROSS REFERENCE TO RELATED APPLICATIONS

The present application is a continuation of U.S. patent application Ser. No. 10/658,814 filed on Sep. 8, 2003, now U.S. Pat. No. 7,181,891, which is incorporated herein by reference.

FIELD OF THE INVENTION

This invention relates to acoustical damping materials and, in particular, to soundproofing materials of a novel laminar construction which significantly improves the soundproofing ability of walls, ceilings, floors, and doors, thereby to prevent the transmission of sounds from one area to another.

BACKGROUND OF THE INVENTION

Noise is emerging as both an economic and public policy issue. Soundproof rooms are required for a variety of purposes. For example, apartments, hotels and schools all require rooms with walls, ceilings and floors that minimize the transmission of sound thereby to avoid annoying people in adjacent rooms. Soundproofing is particularly important in buildings adjacent to public transportation, such as highways, airports and railroad lines, as well as in theaters, home theaters, music practice rooms, recording studios and others. One measure of the severity of the problem is the widespread emergence of city building ordinances that specify a minimum Sound Transmission Class ("STC") rating. Another measure is the broad emergence of litigation between homeowners and builders over the issue of unacceptable noise. To the detriment of the U.S. economy, both problems have resulted in major builders refusing to build homes, condos and apartments in certain municipalities; and in widespread cancellation of liability insurance for builders.

In the past, walls typically were made up of studs with drywall on both exterior surfaces of the studs and baffles or plates commonly placed between the studs in an attempt to reduce the transmission of sound from one room to the next. Unfortunately, even the best of such walls using standard drywall are capable of only reducing sound transmission by approximately 30 db, and much of that is focused on mid-range and high frequencies rather than lower frequencies which cause most of the complaints and litigation.

Various techniques and products have emerged to abate this problem, such as: replacement of wooden studs by steel studs; resilient channels to offset and isolate drywall panels from studs; mass-loaded vinyl barriers; cellulose soundboard; cellulose and fiberglass batt insulation; and techniques such as staggered-beam and double-beam construction. All help reduce the transmission of noise, but, again, not to such an extent that certain sounds (e.g., lower frequencies, high decibel) in a given room are prevented from being transmitted to an adjacent room, including rooms above or below. A brief review of commercially available products shows that there has been little innovation in these techniques and technologies for many years.

Accordingly, what is needed is a new material and a new method of construction to reduce the transmission of sound from a given room to an adjacent room.

SUMMARY OF THE INVENTION

In accordance with this invention a new laminated structure and associated manufacturing process is provided which significantly improves the ability of a wall, ceiling, floor or door to reduce the transmission of sound from one room to an adjacent room, or from the exterior to the interior of a room, or from the interior to the exterior of a room.

The material comprises a lamination of several different materials. In accordance with one embodiment, a laminated substitute for drywall comprises a sandwich of two outer layers of selected thickness gypsum board which are glued each to an interior constraining layer, such as a metal, cellulose (e.g., wood) or petroleum-based product such as vinyl, composite plastic or rubber, using a sound absorbent adhesive. In one embodiment, the constraining layer comprises a selected thickness galvanized steel and the glue layer is a specially formulated "QuietGlue™" of a specific thickness which is a viscoelastic material. Formed on the interior surfaces of the two gypsum boards, the glue layers are each about $\frac{1}{16}$ inch thick and the galvanized steel between 0.005 and 0.5 inch thick. In one instance, a 4 foot×8 foot panel constructed using a $\frac{1}{16}$" layer of glue and 30 gauge galvanized steel weighs approximately 108 pounds versus the weight of a typical drywall of the same thickness of about 75 pounds, has a total thickness of approximately $\frac{5}{8}$ inches and has an STC of approximately 38. The double-sided standard construction using this particular material will give an STC of approximately 58. The result is a reduction in noise transmitted through the wall of approximately 60 db compared to a 30 db reduction of transmitted noise using standard commercially available drywall.

In one embodiment, the galvanized steel metal layer is preferably not oiled and of regular spackle. The resulting product, even though it contains the galvanized steel center sheet, can be cut with a standard hand saw using wood blades, but cannot be scribed and broken like ordinary drywall.

Another embodiment of this invention uses additional layers of material and is non-symmetric. Two external gypsum board layers have directly adjacent their faces layers of QuietGlue, followed by two metal layers, followed by two additional layers of glue, and then a central piece of laminated wood (in one embodiment a layer of laminated wood of the type used in plywood). The total finished thickness of this structure can vary, but the additional two layers of metal result in a significant increase in the attenuation of sound passing through the material.

The laminated sheets of this invention use unique glues capable of substantially absorbing sound and vibration together with one or more constraining layers which reduce the transmissibility of the sound from one layer to the adjacent layers of material. The constraining layers can be metal, cellulose, wood, plastic composites, vinyl or other porous or semi-porous materials. The resulting attenuation of sound is significantly improved compared to the attenuation of sound obtained using standard drywall.

DETAILED DESCRIPTION OF THE DRAWINGS

This invention will be more fully understood in light of the following drawings taken together with the following detailed description.

DETAILED DESCRIPTION

The following detailed description is meant to be exemplary only and not limiting. Other embodiments of this invention—such as the number, type, thickness and placement order of both external and internal layer materials—will be obvious to those skilled in the art in view of this description.

The process for creating such laminar panels takes into account many factors: exact chemical composition of the glue; various symmetric and non-symmetric thicknesses of glue and layered material; pressing process; drying and dehumidification process.

Figure 1:
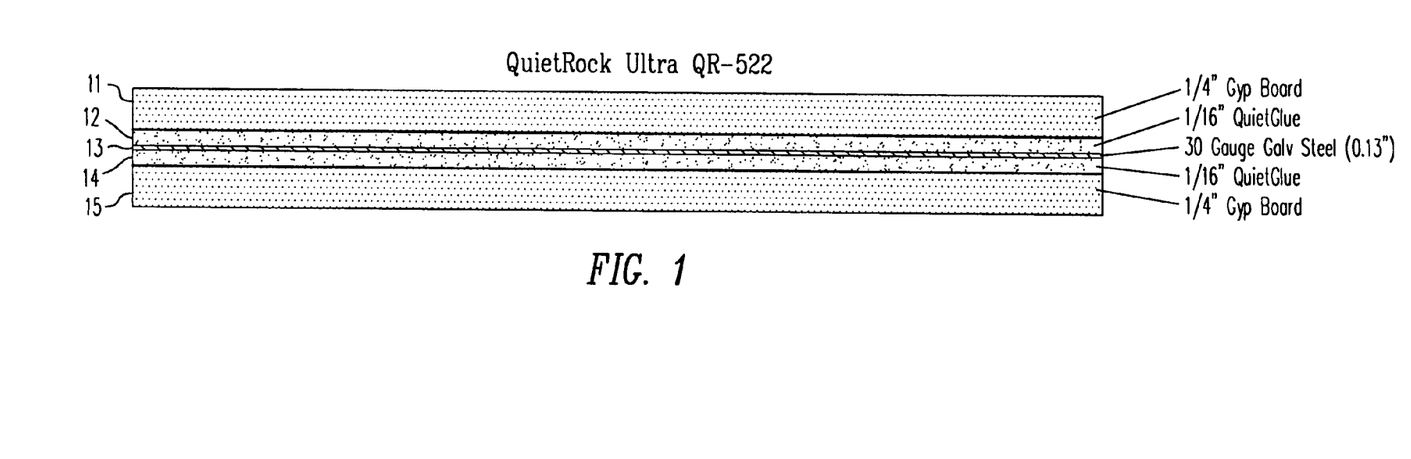
FIG. 1 shows the laminated structure of one embodiment of this invention.

FIG. 1 shows the laminated structure of one embodiment of this invention. In FIG. 1, the layers in the structure will be described from top to bottom with the structure oriented horizontally as shown. It should be understood, however, that the laminated structure of this invention will be oriented vertically when placed on vertical walls and doors, as well as horizontally or even at an angle when placed on ceilings and floors. Therefore, the reference to top and bottom layers is to be understood to refer only to these layers as oriented in FIG. 1 and not in the context of the vertical use of this structure. In FIG. 1, the top layer 11 is made up of a standard gypsum material and in one embodiment is ¼ inch thick. Of course, many other combinations and thicknesses can be used for any of the layers as desired. The thicknesses are limited only by the acoustical attenuation (i.e., STC rating) desired for the resulting laminated structure and by the weight of the resulting structure which will limit the ability of workers to install the laminated structure on walls, ceilings, floors and doors for its intended use.

The gypsum board in top layer 11 typically is fabricated using standard well-known techniques and thus the method for fabricating the gypsum board will not be described. Next, on the bottom of the gypsum board 11 is a layer of glue 12 called QuietGlue. Glue 12, made of a unique viscoelastic polymer, has the property that the energy in the sound which strikes the glue, when constrained by surrounding layers, will be significantly absorbed by the glue thereby reducing the sound's amplitude across a broad frequency spectrum, and thus the energy of sound which will transmit through the resulting laminated structure. Typically, this glue is made of the materials as set forth in TABLE 1, although other glues having the characteristics set forth directly below Table 1 can also be used in this invention.

TABLE 1

Quiet Glue ™ Chemical Makeup

| | WEIGHT % | |
|---|---|---|
| Components | Min | Max |
| acetaldehyde | 0.00001% | 0.00010% |
| acrylate polymer | 33.00000% | 65.00000% |
| acrylonitrile | 0.00001% | 0.00100% |
| ammonia | 0.00100% | 0.01000% |
| bis(1-hydroxy-2-pyridinethionato) Zinc | 0.01000% | 0.10000% |
| butyl acrylate | 0.00100% | 0.10000% |
| butyl acrylate, methyl methacrylate, styrene, methacrylic acid 2-hydroxyethyl acrylate polymer | 5.00000% | 15.00000% |
| CI Pigment Yellow 14 | 0.01000% | 0.02000% |
| ethyl acrylate | 0.00001% | 0.00010% |
| ethyl acrylate, methacrylic acid, polymer with ethyl-2-propenoate | 1.00000% | 5.00000% |

TABLE 1-continued

Quiet Glue ™ Chemical Makeup

| | WEIGHT % | |
|---|---|---|
| Components | Min | Max |
| formaldehyde | 0.00100% | 0.01000% |
| hydrophobic silica | 0.00100% | 0.01000% |
| paraffin oil | 0.10000% | 1.00000% |
| polymeric dispersant | 0.00100% | 0.01000% |
| potassium tripolyphosphate | 0.00000% | 0.00200% |
| silicon dioxide | 0.00100% | 0.10000% |
| sodium carbonate | 0.01000% | 0.10000% |
| stearic acid, aluminum salt | 0.00100% | 0.10000% |
| surfactant | 0.00100% | 0.10000% |
| vinyl acetate | 0.10000% | 1.00000% |
| water | 25.00000% | 40.00000% |
| zinc compound | 0.00100% | 0.10000% |

The physical solid-state characteristics of QuietGlue include:
1) a broad glass transition temperature below room temperature;
2) mechanical response typical of a rubber (i.e., high elongation at break, low elastic modulus);
3) strong peel strength at room temperature;
4) weak shear strength at room temperature;
5) swell in organic solvents (e.g., Tetrahydrofuran, Methanol);
6) does not dissolve in water (swells poorly);
7) peels off the substrate easily at temperature of dry ice.

Following glue layer 12 is a metal layer 13. Metal layer 13 is, in one embodiment, 30 gauge galvanized steel of 0.013 inch thickness. Of course, other gauge galvanized steel and even other metals can be used if desired. For example, aluminum can also be used if desired, as can specialty metals such as sheets of ultra-light weight titanium and laminated layers of metal including laminates of aluminum and titanium. Of importance is that galvanized steel, if used, be non-oiled and of regular spackle. Non-oil is required to insure that the QuietGlue layer 12 will adhere to the top surface of metal layer 13 and the adjacent QuietGlue layer 14 on the bottom of metal layer 13 will also adhere to the surfaced metal 13. Regular spackle insures that the metal has uniform properties over its whole area.

Next, glue layer 14 is placed in a carefully controlled manner with respect to coverage and thickness on the bottom of metal layer 13. Glue layer 14 is again a viscoelastic material which absorbs sound and is typically the same material as glue layer 12. Finally, gypsum board layer 15 is placed on the bottom of the structure and carefully pressed in a controlled manner with respect to uniform pressure (pound per square inch), temperature and time Finally, the assembly is subjected to dehumidification and drying to allow the panels to dry, typically for forty-eight (48) hours.

Typically, but not always, gypsum board layers 11 and 15 will contain fiber to reduce shrinkage so that the resulting laminar structure will meet fire codes. Typical fire codes require a wall structure capable of withstanding flames for up to one hour. The metal core, together with the external gypsum board layers are intended to give to the resulting laminar structure a minimum of one hour resistance to fire, and possibly as high as four (4) hours in certain configurations, and thereby allows the resulting structure to meet typical fire codes.

Metal layer 13, typically 30-gauge steel (but may be other metals, ranging from 10 gauge to 40 gauge, depending on weight, thickness, and STC desired), is about the thickness of a business card. Of importance, before assembling, this metal should not be creased because creasing will ruin the ability of this metal to assist in reducing the transmission of sound. Only completely flat, undamaged pieces of metal can be used in the laminar structure.

In an alternative embodiment, steel 13 is replaced by mass-loaded vinyl or similar product. However, the steel has much less forgiveness than vinyl and thus can outperform vinyl as a constraining layer. However, for other ease-of-cutting reasons, vinyl can be used in the laminar structure in place of steel, if desired. Cellulose, wood, gypsum, plastic or other constraining materials may also be used in place of vinyl or metal. The alternative material can be any type and any appropriate thickness.

The resulting structure is capable of being cut using standard wood saws with wood blades.

Figure 2:
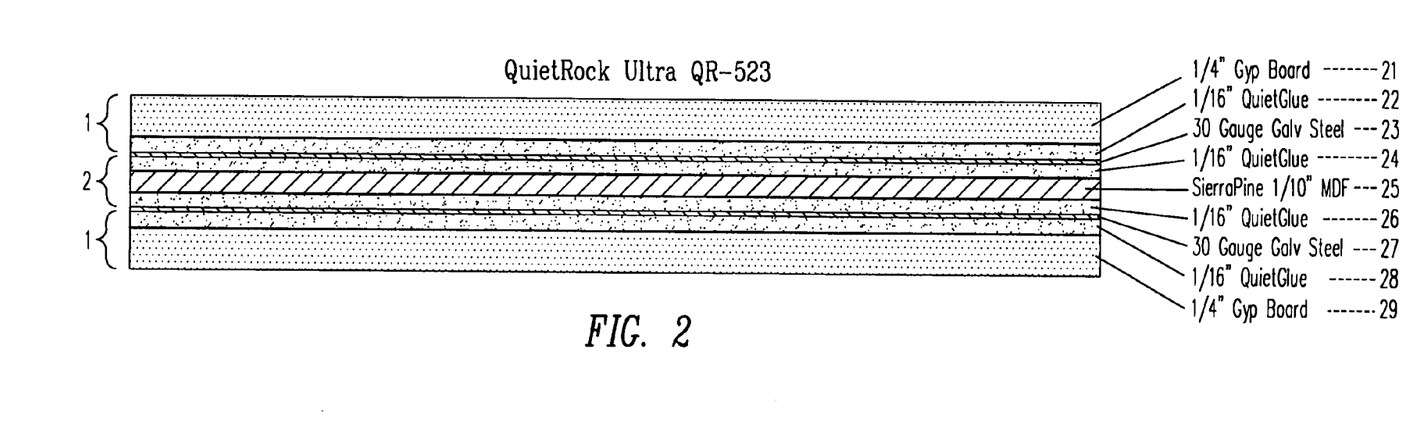
FIG. 2 shows a second embodiment of a laminated structure containing nine (9) layers of material capable of significantly reducing the transmission of sound through the material.

FIG. 2 shows a second embodiment of this invention. Two external layers 21 and 29 of gypsum board have coated on each of their interior faces a layer of QuietGlue 22 and 22, respectively, preferably made of a viscoelastic polymer, such as glue 12 in FIG. 1. Such a viscoelastic polymer has the ability to absorb sound energy through deformation of the viscoelastic material in response to the acoustic energy of the sound. On the interior faces of the QuietGlue are two sheet metal layers 23 and 27. Typically, these sheet metal layers 23 and 27 are galvanized steel. In one embodiment, the galvanized steel is 30 gauge, 0.013 inches thick, but other thicknesses of steel, as well as other metals, can also be used as desired. The interior faces of the steel layers 23 and 27 are coated with additional layers 24 and 26, respectively, of QuietGlue, again a viscoelastic material of the same type as glue layers 22 and 28. Then the core of the structure is made up of a pine laminated sheet 25 which is of a type commonly used in plywood. In one embodiment, the pine laminated sheet is $1/10$th of an inch thick, but may also be MDF or other wood types.

Again, the galvanized steel is non-oiled and regular spackle for the reasons discussed above in conjunction with the embodiment of FIG. 1. The layers of glue are all viscoelastic material capable of absorbing sound. The resulting product has a thickness of approximately $7/8^{th}$ of an inch and weighs approximately 148 pounds per 4×8 section. The stand-alone STC for the resulting material is 42 which yields a double-sided standard construction STC of 62. The steel layers should not be creased before assembly. Creasing of the steel may ruin the steel for its intended purpose. Using completely flat pieces undamaged is required to achieve optimal results. The resulting structure again is cutable with a standard power saw using wood blades. The interior layer 25 of wood is in one embodiment Sierra pine $1/10$ inch thick MDF acquired in Rocklin, Calif. (http://www.sierrapine.com).

In fabricating the structures of FIGS. 1 and 2, the glue is first rolled in a prescribed manner, typically to $1/16$ inch thickness, although other thicknesses can be used if desired, onto the gypsum and then steel is laid on the glue. Depending on the drying and dehumidification techniques deployed, anywhere from 10 to 30 hours are required to dry totally the glue in the case that the glue is water-based. A solvent-based viscoelastic glue can be substituted. The resulting structure is dried in a prescribed manner under a pressure of approximately 2 to 5 pounds per square inch, depending on the exact requirements of each assembly, although other pressures can be used as desired. To make the embodiment of FIG. 2, each of the gypsum board-glue-metal layer structures has an additional layer of glue rolled onto the exposed surface of the metal to approximately $1/16^{th}$ inch thickness and then the thin pine wood layer is placed between the two layers of glue on the already fabricated gypsum-glue-metal sheets. The resulting structure is placed in a press and 1 to 5 pounds per square inch of pressure is applied to the structure and up to 48 hours is allowed for drying.

Figure 3:
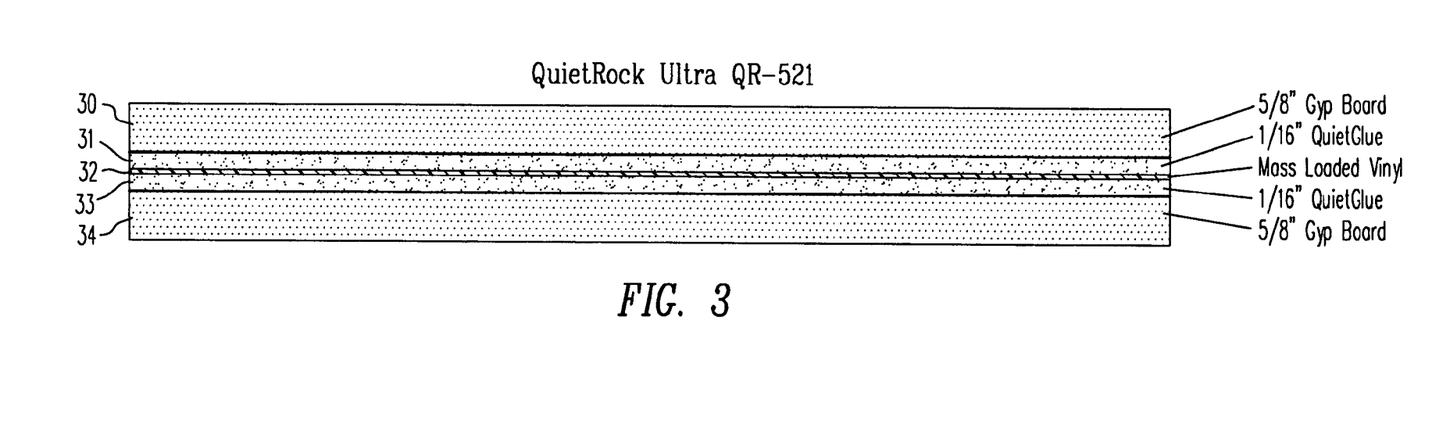
FIGS. 3 and 4 show alternative embodiments of this invention capable of reducing the transmission of sound through the material.

FIG. 3 shows another embodiment of the acoustical soundproofing material of this invention. In FIG. 3, two external layers of gypsum board 30 and 34 have on their interior faces glue layers 31 and 33, respectively. Between the two glue layers 31 and 33 is a constraining material 32 made up of vinyl. This vinyl is mass loaded and, in one embodiment, is 1 pound per square foot or greater, and is available from a number of manufacturers, including Technifoam, Minneapolis, Minn. The total weight of this structure when the external layers 30 and 34 of gypsum board are each $5/8$ inch thick, the layers of viscoelastic QuietGlue 31 and 33 are each approximately $1/16$ of an inch thick and the mass loaded vinyl is approximately $1/32$ of an inch thick, is about 190 pounds per 4×8 foot section. The total finished thickness of the material is 1.3 to 1.5 inches depending on the thickness of the vinyl and the actual thicknesses of the viscoelastic QuietGlue layers 31 and 33.

The embodiment of FIG. 3 cannot be scored like regular drywall, but rather must be cut using a wood saw. A typical wood saw blade is adequate to actually cut the soundproofing material of FIG. 3.

Figure 4:
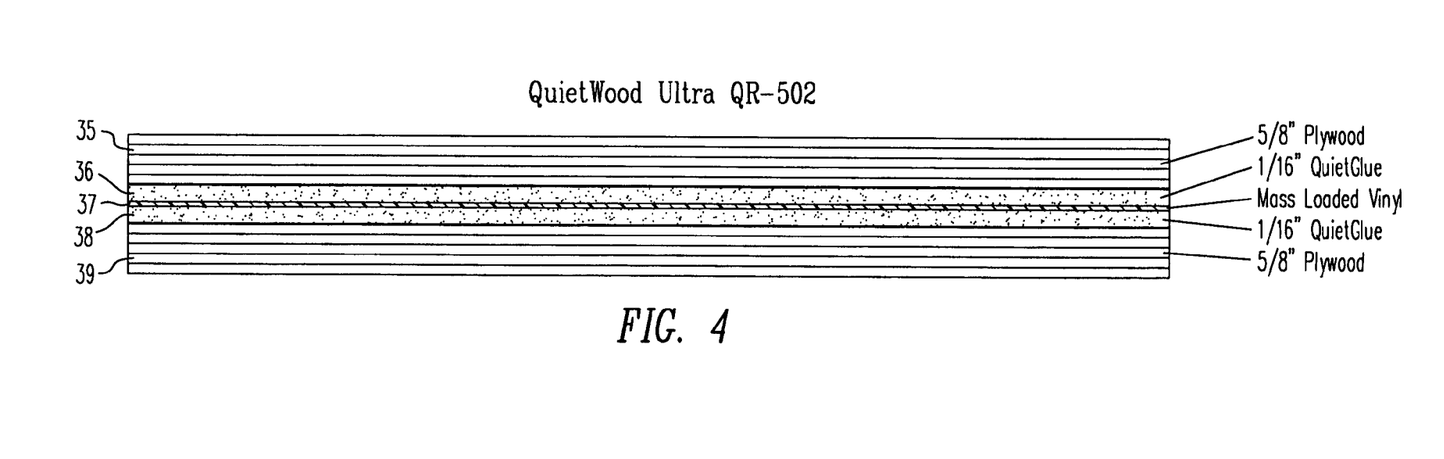

FIG. 4 shows an additional embodiment of the soundproofing material of this invention. In this embodiment, two external layers 35 and 39 are $5/8$ inch plywood and have on their interior faces layers 36 and 38 of QuietGlue, respectively. Between the QuietGlue is a layer of mass loaded vinyl 37. The structure shown in FIG. 4 is meant to be used on floors or in other construction areas where wood would normally be used. The plywood sheets 35 and 39 are each typically $5/8$ inch thick in one embodiment. In this embodiment, the layers of QuietGlue 36 and 38 are each approximately $1/16$ inch thick (although other thicknesses can be used if desired) and the mass loaded vinyl 37 is typically $1/16$ to $1/4$ inch thick. When the mass loaded vinyl is $1/8$ inch thick, then the total thickness of the structure of FIG. 4 is approximately 1.5 inches thick. If the vinyl is $1/16$ inch thick, then the total thickness is approximately 1.4 inches.

The structure of FIG. 3 standing alone has an STC of 38, while the structure of FIG. 4 has an STC of 36. The structures of FIGS. 1 and 2 have STCs of 37 and 38, respectively.

It is noted that uneven application of QuietGlue or leaving an air gap at the ends of the sheets of soundproofing material described above may hurt the STC ratings by several db. Moreover, to improve the soundproofing qualities of walls, floors, ceilings or doors made with these materials, glue must be evenly applied all the way to the ends and corners of the sheets. None of the panels described above can be scored like regular drywall. Rather, these panels must be cut using a saw blade, typically a wood saw blade.

The sound transmission class numbers given above basically are numbers which are used in the architectural field to rate partitions, doors and windows for their effectiveness in blocking sound. The number assigned to a particular partition design as a result of STC testing represents a best fit type of approach to a set of curves that define the sound transmission class. The test is conducted in such a way to make it independent of the test environment and gives a number for the partition only. The STC measurement method is defined by ASTM E90 laboratory test for sound measurements obtained in $1/3$ octave bands, and ASTM E413 for calculating "STC" (Sound Transmission Class) numbers from the sound transmission loss in each partition, and these standards are available on the internet at http://www.astm.org.

Figure 5:
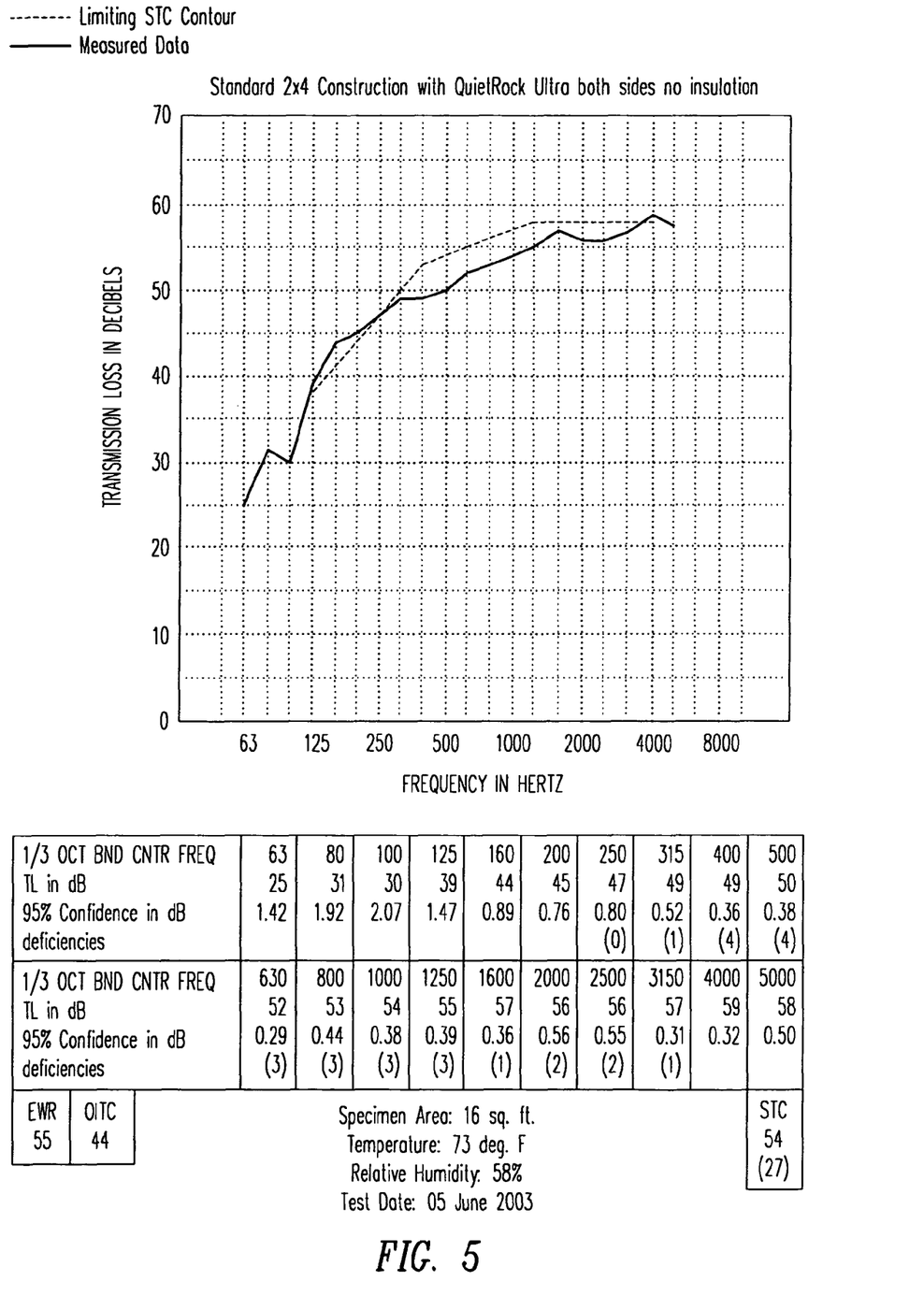
FIGS. 5-10 show sound attenuation test results on several embodiments of this invention.

Data showing the transmission loss in decibels as a function of frequency for the soundproofing material of this invention is set forth in FIGS. 5, 6, 7, 8, 9 and 10. FIG. 5 shows a standard 2×4 construction with Quiet Rock Ultra, as shown in FIG. 3, on both sides of studs with no insulation. The transmission loss in decibels varies from 25 db at 63 Hz to approximately 58 db at 4,000 Hz.

The center frequency of octave bands is set forth in the two rows of the table. The top line of each row represents the ⅓ octave band center frequency. The second row of numbers in each horizontal category represents the total in db, and the third set of numbers represents a 95% confidence level in db deficiencies. The EWR and OITC stand for External Wall Rating and Outdoor-Indoor Transmission Class, respectively, and represent other methods of measuring transmission loss. The final sound transmission class number is set forth under the notation STC in the lower right corner. For the use of two panels of the type shown in FIG. 3, on both sides of standard 2"×4" wood stud construction, the STC is 54.

It is known to those practicing in this field that a similar configuration with standard ⅝ inch drywall on both sides of standard 2×4 construction yields an STC of 34. Accordingly, this invention yields a 20 STC point improvement over standard drywall in this particular construction.

The National Research Council of Canada (NRC) has documented the STC rating of many other configurations (e.g., using wood and steel studs in standard, staggered beam or double beam construction with various isolators such as resilient channels and with various acoustic insulation fillers such as sound board, cellulose and fiberglass batt). This invention has been subjected to the same types of tests.

Figure 6:
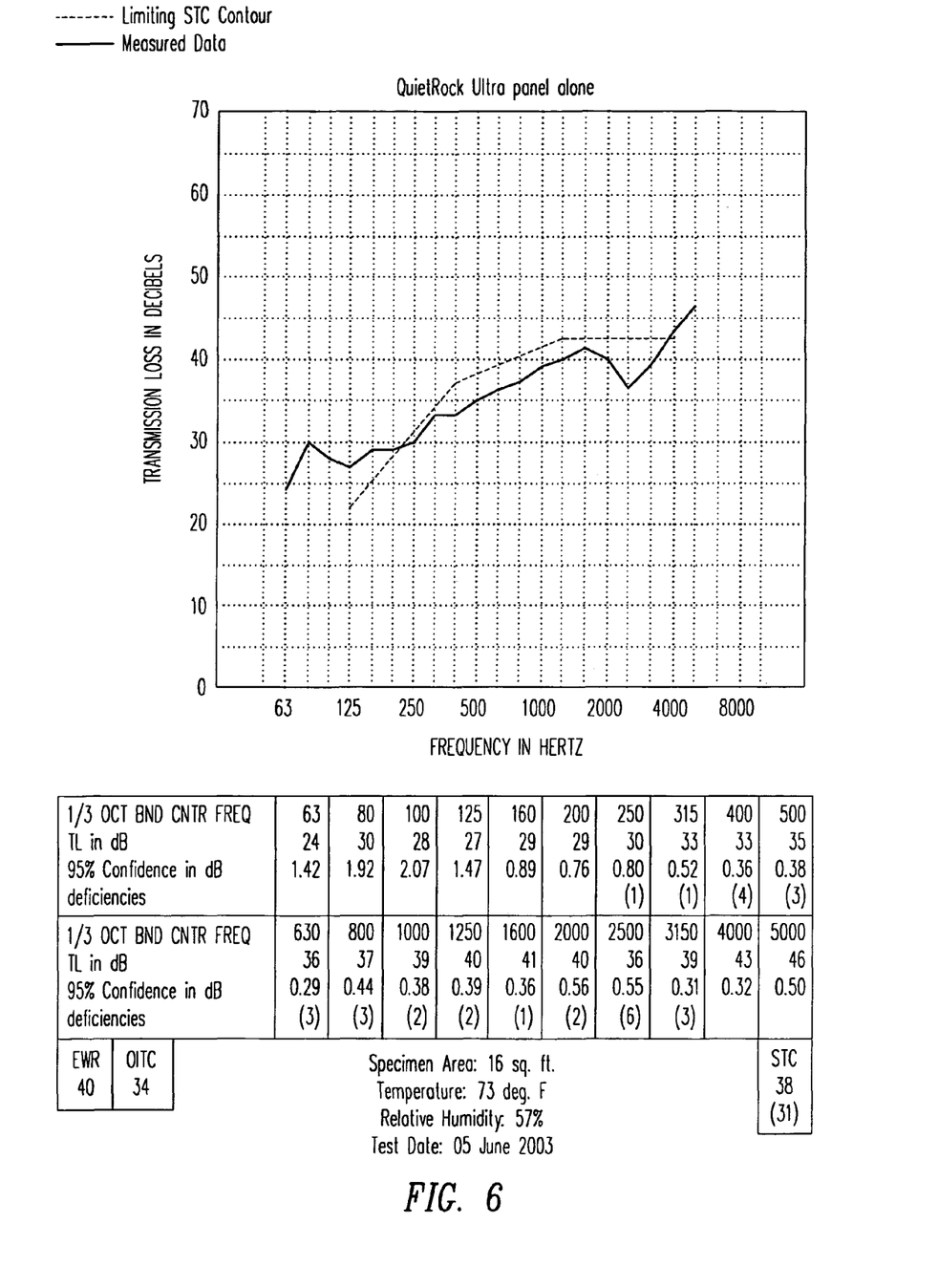

The use of a single panel, alone, of the type shown in FIG. 3 yields an STC of 38, as shown in the bottom right corner of FIG. 6. Thus, the use of the single panel of the type shown in FIG. 1 to reduce sound transmission is less effective than the use of two panels on both sides of 2×4 studs as shown in FIG. 5.

Figure 7:
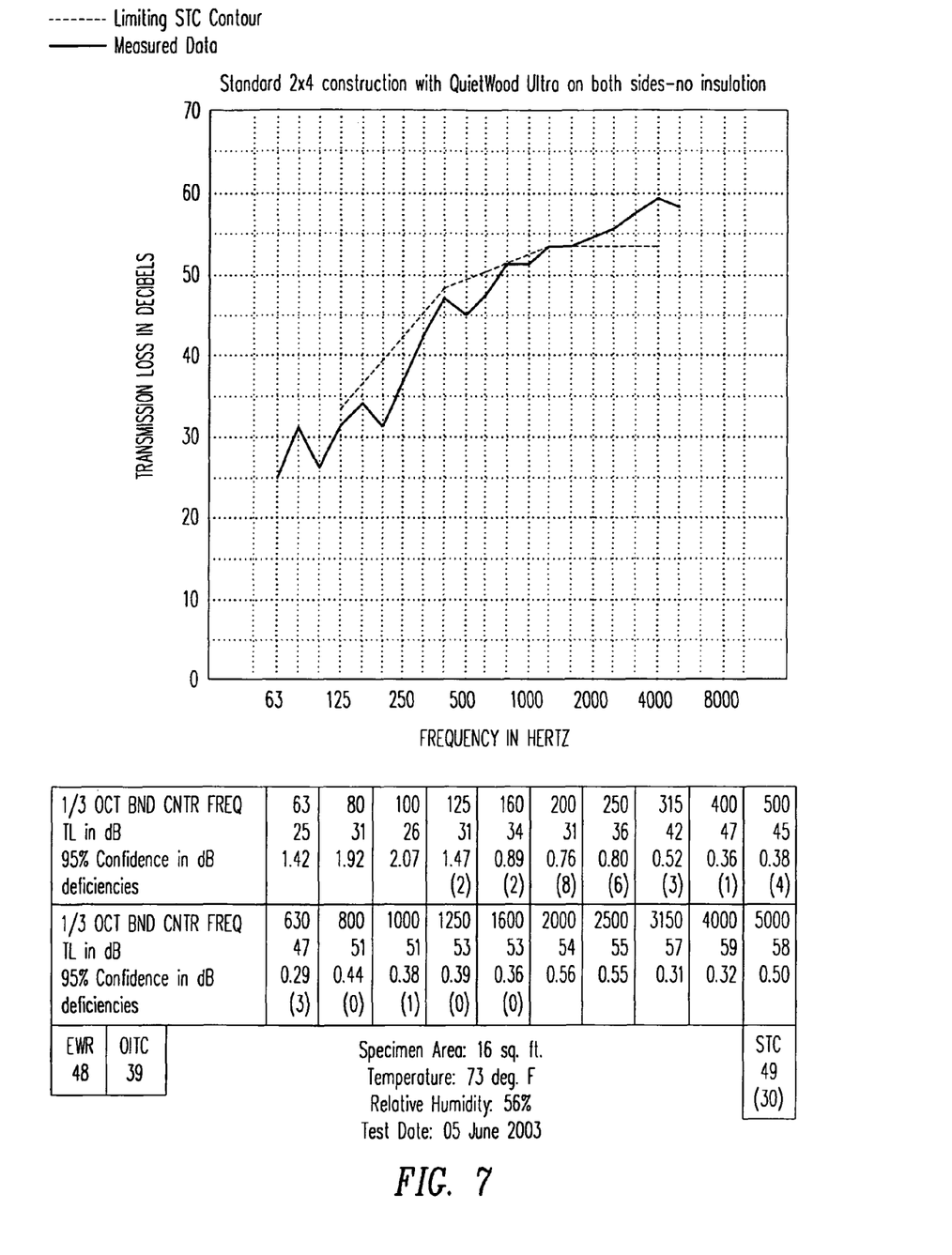

The use of the structure shown in FIG. 4 on both sides of standard 2×4 construction results in an STC of 49, as shown in FIG. 7. This indicates that the wood structure shown in FIG. 4 is less effective in reducing sound transmission than the structure shown in FIG. 3, which contains gypsum board on the external surfaces together with an internal layer of vinyl, though both are significant improvements over standard materials.

It is known to those practicing in this field that a similar wall to the wall in FIG. 7 with standard plywood on both sides yields an STC rating of 29. Thus, the wall of FIG. 7 represents a significant improvement over standard wood.

Figure 8:
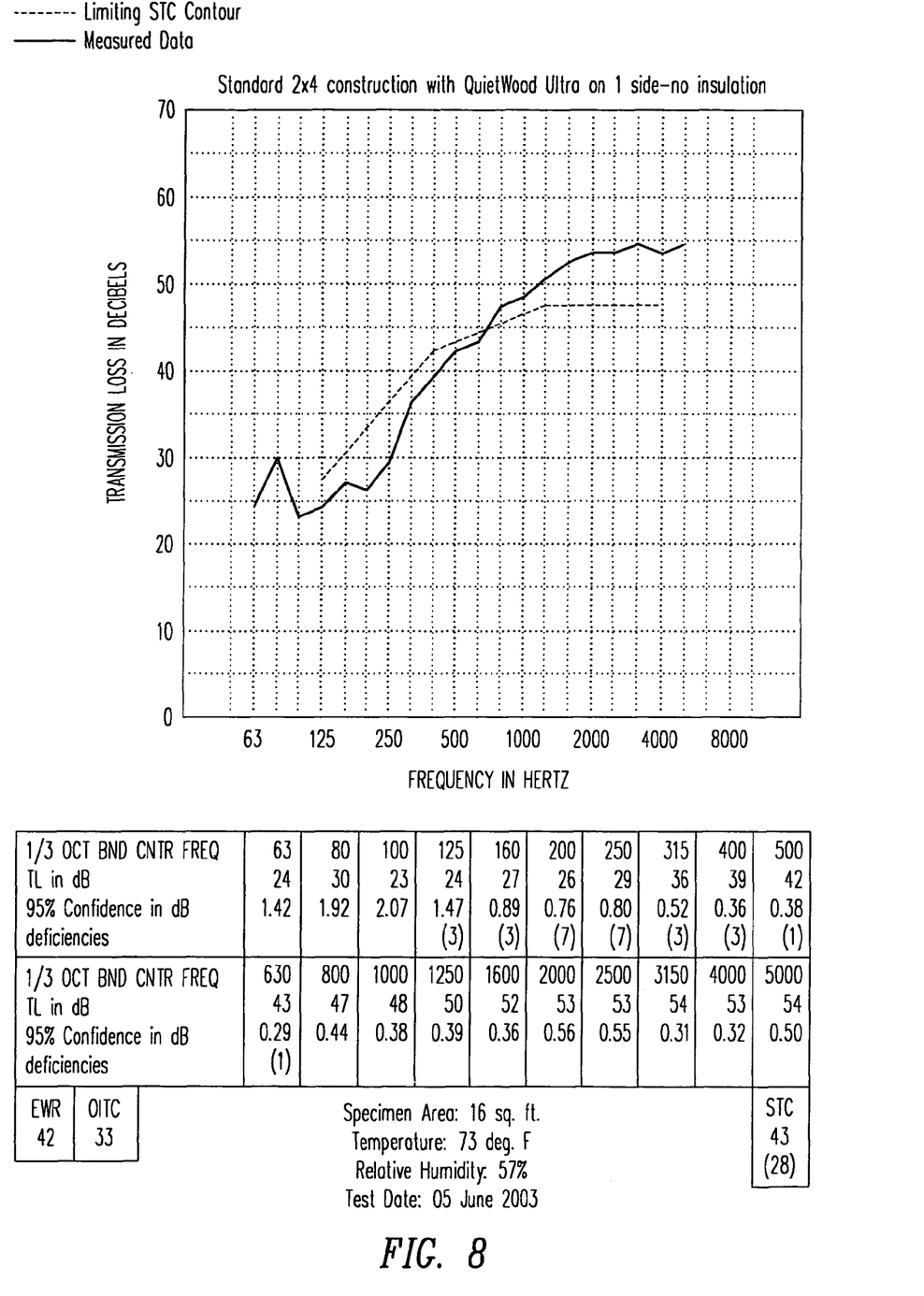
Figure 9:
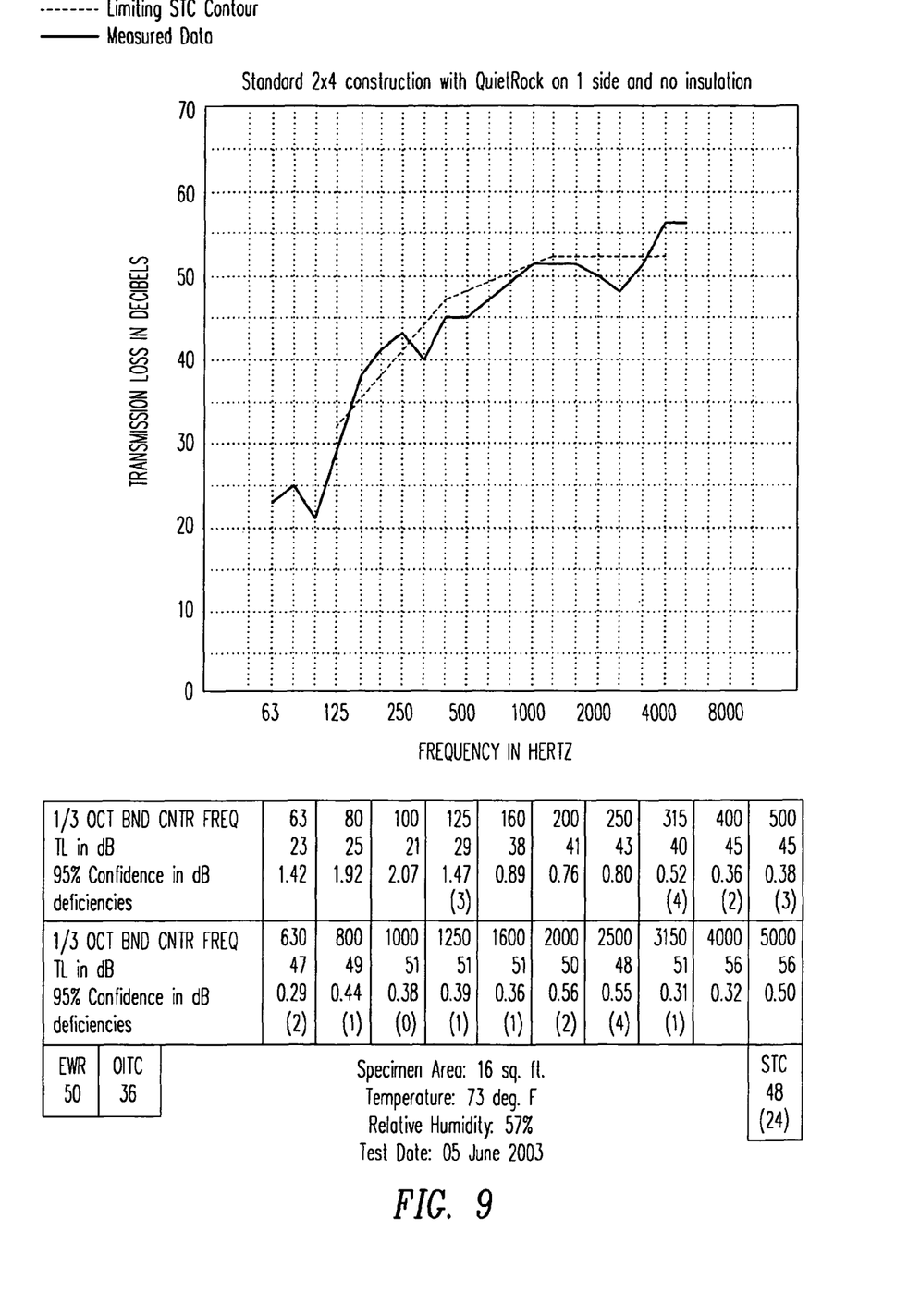
Figure 10:
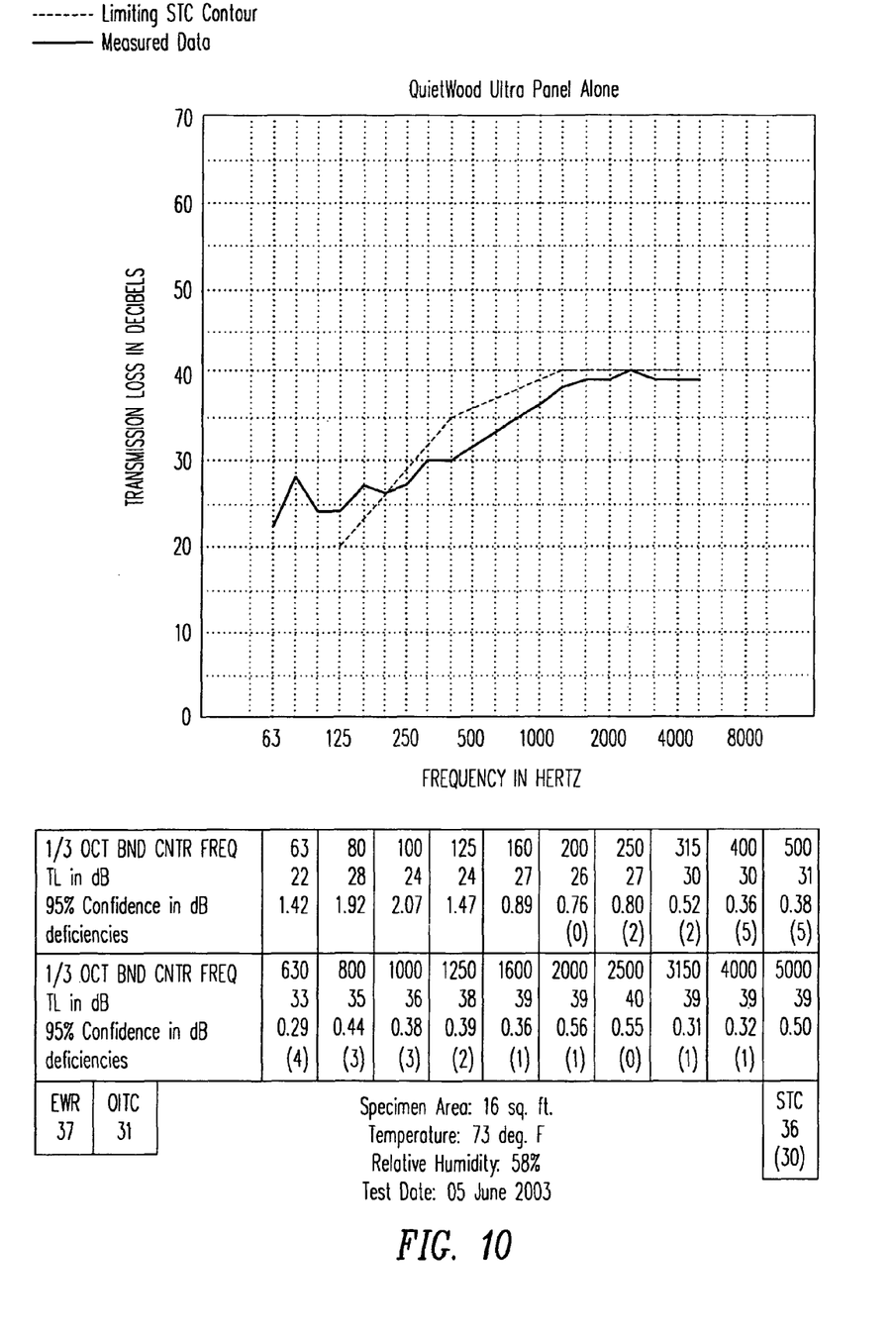

The use of the structure of FIG. 4 on one side with no insulation with standard 2×4 construction results in an STC of 43, as shown in the graph of FIG. 8. This is a substantial improvement in sound attenuation over standard plywood, but not as good as use of standard 2×4 construction with the structure of FIG. 4 on both sides of the studs, as shown in FIG. 7. Finally, the use of the structure of FIG. 4 alone results in an STC of 36 as shown in FIG. 10, which is below the STC of 38 (FIG. 6) for the structure of FIG. 3 in a similar configuration.

Accordingly, the laminar structure of this invention provides a significant improvement in the sound transmission class number associated with the structures and thus reduces significantly the sound transmitted from one room to adjacent rooms.

An alternative embodiment of this invention is asymmetric, being made up of a relatively thick layer of material on one surface of which is placed viscoelastic glue. Over the viscoelastic glue is placed a thin layer of material relative to the first layer of material. This thin layer of material can be a constraining layer, such as metal or vinyl or rubber or any other appropriate thin material. This structure has sound reducing qualities, but is lighter and easier to handle than the structures described in FIGS. 1 through 4. Such a structure, for example, could be made up of layers 11, 12 and 13 of the structure shown in FIG. 1.

The dimensions given for each material in the laminar structures of this invention can be varied as desired to control cost, overall thickness, weight and STC results. The described embodiments and their dimensions are illustrative only and not limiting.

Other embodiments of this invention will be obvious in view of the above description.

What is claimed is:

1. A laminated, sound-absorbing structure which comprises:
   a layer of first non-metallic material having two surfaces, one of said two surfaces comprising an outer surface, said non-metallic material being selected from the group consisting of gypsum, plywood, wood, and cellulose-based materials;
   a layer of viscoelastic glue on the other of said two surfaces; and
   a layer of a second material over said viscoelastic glue; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

2. A laminated, sound-absorbing structure as in claim 1, wherein said layer of second material is ½ to 9/10 the thickness of the first material.

3. A laminated, sound-absorbing structure which comprises:
   a layer of first non-metallic material having two surfaces, one of said two surfaces comprising an outer surface, said non-metallic material being selected from the group consisting of gypsum, plywood, wood, and cellulose-based materials;
   a layer of viscoelastic glue on the other of said two surfaces;
   a layer of a second non-metallic material over said viscoelastic glue; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

4. A laminated, sound-absorbing structure as in claim 3, wherein said layer of second material is ½ to 9/10 of the first material.

5. A laminated, sound-absorbing structure for use in walls, floors, ceilings or doors which comprises:
   a layer of first non-metallic material having two surfaces, one of said two surfaces comprising an outer surface, said non-metallic material being selected from the group consisting of gypsum, plywood, wood, and cellulose-based materials;
   a layer of viscoelastic glue on the other of said two surfaces; and
   a layer of a second material over said viscoelastic glue;
   wherein said structure is capable of use in walls, floors, ceilings or doors to attenuate sound; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

6. A laminated, sound-absorbing structure as in claim 5, wherein said layer of second material is ½ to 9/10 of the first material.

7. A laminated, sound-attenuating structure for use in walls, floors, ceilings or doors, which comprises:

a layer of first non-metallic material having two surfaces, one of said two surfaces comprising an outer surface, said non-metallic material being selected from the group consisting of gypsum, plywood, wood, and cellulose-based materials;

a layer of viscoelastic glue on the other of said two surfaces; and a layer of a second non-metallic material over said viscoelastic glue;

wherein said structure is capable of use in walls, floors, ceilings or doors to attenuate sound; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

8. A laminated, sound-attenuating structure as in claim 7, wherein said layer of second material is ½ to 9/10 the thickness of the first material.

9. A laminated, sound-attenuating structure which comprises:

a layer of gypsum having two surfaces, one of said two surfaces comprising an outer surface;

a layer of viscoelastic glue on the other of said two surfaces; and a layer of a non-metallic material over said viscoelastic glue;

wherein said structure is capable of use in walls, floors, ceilings or doors to attenuate sound; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

10. A laminated, sound-absorbing structure which comprises:

a layer of first non-metallic, non-glass material having two surfaces, one of said two surfaces comprising an outer surface, said non-metallic, non-glass material being selected from the group consisting of gypsum, plywood, wood, and cellulose-based materials;

a layer of viscoelastic glue on the other of said two surfaces; and a layer of a second material over said viscoelastic glue; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

11. A laminated, sound-absorbing structure as in claim 10, wherein said layer of second material is ½ to 9/10 the thickness of the first material.

12. A laminated, sound-absorbing structure which comprises:

a layer of first non-metallic, non-glass material having two surfaces, one of said two surfaces comprising an outer surface, said non-metallic, non-glass material being selected from the group consisting of gypsum, plywood, wood, cellulose-based materials;

a layer of viscoelastic glue on the other of said two surfaces; and a layer of a second non-metallic material over said viscoelastic glue; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

13. A laminated, sound-absorbing structure as in claim 12, wherein said layer of second material is ½ to 9/10 the thickness of the first material.

14. A laminated, sound-absorbing structure for use in walls, floors, ceilings or doors which comprises:

a layer of first non-metallic, non-glass material having two surfaces, one of said two surfaces comprising an outer surface, said non-metallic, non-glass material being selected from the group consisting of gypsum, plywood, wood, cellulose-based materials;

a layer of viscoelastic glue on the other of said two surfaces; and a layer of a second material over said viscoelastic glue;

wherein said structure is capable of use in walls, floors, ceilings or doors to attenuate sound; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

15. A laminated, sound-absorbing structure as in claim 14, wherein said layer of second material is ½ to 9/10 the thickness of the first material.

16. A laminated, sound-attenuating structure for use in walls, floors, ceilings or doors, which comprises:

a layer of first non-metallic, non-glass material having two surfaces, one of said two surfaces comprising an outer surface, said non-metallic, non-glass material being selected from the group consisting of gypsum, plywood, wood, cellulose-based materials;

a layer of viscoelastic glue on the other of said two surfaces; and a layer of a second non-metallic, non-glass material over said viscoelastic glue;

wherein said structure is capable of use in walls, floors, ceilings or doors to attenuate sound; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

17. A laminated, sound-attenuating structure as in claim 16, wherein said layer of second material is ½ to 9/10 the thickness of the layer of the first material.

18. A laminated, sound-attenuating structure which comprises:

a layer of gypsum having two surfaces, one of said two surfaces comprising an outer surface;

a layer of viscoelastic glue on the other of said two surfaces; and a layer of a non-metallic, non-glass material over said viscoelastic glue;

wherein said structure is capable of use in walls, floors, ceilings or doors to attenuate sound; and further wherein said viscoelastic glue comprises an amount between 5% by weight and 15% by weight of a compound selected from the group consisting of butyl acrylate, methyl acrylate, styrene, and methacrylic acid 2-hydroxyethyl acrylate polymer.

19. A laminated, sound-attenuating structure as in claim 18, wherein said layer of non-metallic, non glass material is ½ to 9/10 the thickness of the layer of gypsum.

* * * * *